(12) United States Patent
Penrod

(10) Patent No.: US 8,996,222 B1
(45) Date of Patent: Mar. 31, 2015

(54) COMPEL SYSTEM FOR POWERING AN ELECTRIC MOTOR VEHICLE

(71) Applicant: Fred F. Penrod, Bonita Springs, FL (US)

(72) Inventor: Fred F. Penrod, Bonita Springs, FL (US)

(*) Notice: Subject to any disclaimer, the term of this patent is extended or adjusted under 35 U.S.C. 154(b) by 0 days.

(21) Appl. No.: 14/290,081

(22) Filed: May 29, 2014

(51) Int. Cl.
G06F 17/00 (2006.01)
B60L 11/02 (2006.01)

(52) U.S. Cl.
CPC ............................ B60L 11/02 (2013.01)
USPC ................ 701/22; 180/302; 60/370; 60/409; 123/242; 123/245

(58) Field of Classification Search
CPC ....... B60L 11/002; B60L 1/003; B60L 8/003; Y02T 10/7005; B60K 3/00
USPC ....... 701/22; 180/302; 60/370, 409; 123/242, 123/245
See application file for complete search history.

(56) References Cited

U.S. PATENT DOCUMENTS

| | | | |
|---|---|---|---|
| 7,189,177 B2 * | 3/2007 | Takasu et al. | 475/5 |
| 7,315,089 B2 * | 1/2008 | Lambertson | 290/1 A |
| 8,436,489 B2 * | 5/2013 | Stahlkopf et al. | 307/43 |
| 8,450,884 B2 * | 5/2013 | Stahlkopf et al. | 307/151 |
| 8,482,152 B1 * | 7/2013 | Stahlkopf et al. | 307/43 |
| 2004/0237517 A1 * | 12/2004 | Cho et al. | 60/370 |
| 2008/0277174 A1 * | 11/2008 | Grabbe | 180/65.2 |
| 2011/0315463 A1 * | 12/2011 | Penrod | 180/65.245 |

* cited by examiner

Primary Examiner — McDieunel Marc
(74) Attorney, Agent, or Firm — Werner H. Schroeder

(57) ABSTRACT

The inventive concept is directed to a "COMPEL" system. The word compel is an acronym of the words "compressed air and electricity". The compel system is a system of mechanical devices aligned together to propel a vehicle without employing any fossil fuel and creating very little or no detectable pollution. The motion source is a single electric engine that drives the vehicle by way of a transmission. The source/s for producing the electricity originate in two different manners. One source is of the motion of the vehicle itself and responsible for the action of the second source. Conversely, the second source provides the energy to propel the vehicle, Thus, each source is generally dependent upon the other. However, the holding reserve capacity of the fuel tank allows for the compressed air engine source to mobilize the vehicle from a dead stop and thereby re-engage the other generating source/s. The other energy generating sources are elements driven by the axle of the vehicle. All functions of all of the elements are controlled by a computer.

3 Claims, 3 Drawing Sheets

COMPEL SYSTEM FOR POWERING AN ELECTRIC MOTOR VEHICLE

This application is a CIP of the provisional application No. 61/398,365 filed on Jun. 25, 2010. It is also a Refile of application Ser. No. 12/925,537, filed on Oct. 25, 2010.

BACKGROUND OF THE INVENTION

It is recognized that there are personal automobiles that are powered by electric batteries, compressed air motors, alternating combinations of these and in cases embracing a fossil fuel engine. There is a trend these days to wean automobiles from gasoline powered gasoline motors for the enhancement and maintenance of the atmosphere and the environment and a reduction of a dependency of fossil fuel. One solution is a hybrid vehicle which uses some electricity to power the vehicle. The electricity being used is being reintroduced by way of a small gasoline engine or by using brake power to replenish some of the consumed electricity. A pure electric vehicle up to date has not been accomplished because an electricity powered vehicle, by way of batteries, so far, has not been feasible because of the limited capacity and length of the life of the batteries. That means, a totally battery powered vehicle is not in existence to date. Thus far, all of the above involve direct power from an engine which requires "refueling" after a certain period of time or direct power from a battery which also requires refueling. These refueling requirements are through actual fuel stations or plug-in facilities. While fossil fuels can be obtained in a relative short period of time, battery charging requirements, by way of plug-ins, take much too long periods of time that makes this process uneconomic and a total waste of time.

BRIEF DESCRIPTION OF THE INVENTION

The inventive concept completely eliminates the use of fossil fuel, such as gasoline or diesel fuel. The name of COMPEL SYSTEM is derived from, as an acronym, from the words "compressed air and electricity. The COMPEL SYSTEM is a system of mechanical devices aligned together to propel an automobile vehicle without employing fossil fuel and should produce very little or no pollution. The devices used in the system are lithium or similar batteries and those devices that are using and producing compressed air.

While the COMPEL SYSTEM can propel a personal vehicle almost indefinitely and does so in a capacity equally as well as vehicles requiring fossil fuel, COMPEL is not a perpetual motion device or system and is not proposed as such. Component parts will wear out with use and need to be replaced much the same when compared to conventional vehicles. However, the rate of replacing or repairing the vehicles or the their parts thereof is seen to be much lower since, as will be shown, the inventive vehicle has quite fewer parts that are subject to strong forces, such as in internal combustion engine and the heat created thereby.

The motion source in a COMPEL system is a single electric engine and the source/s for producing the electricity to operate the engine originate in two manners. One source is the result of the motion of the vehicle itself and is responsible for the action of the second source. The second source provides the energy to propel the vehicle. Thus, each source is generally dependent on the other. However, the holding reserve capacity of the fuel tank (compressed air) allows for the compressed air engine source to mobilize the vehicle itself to move from a dead stop and thereby reengage the other generating sources. The process will be described later under the heading "operation.

DETAILED DESCRIPTION OF THE INVENTION

Figure 1:
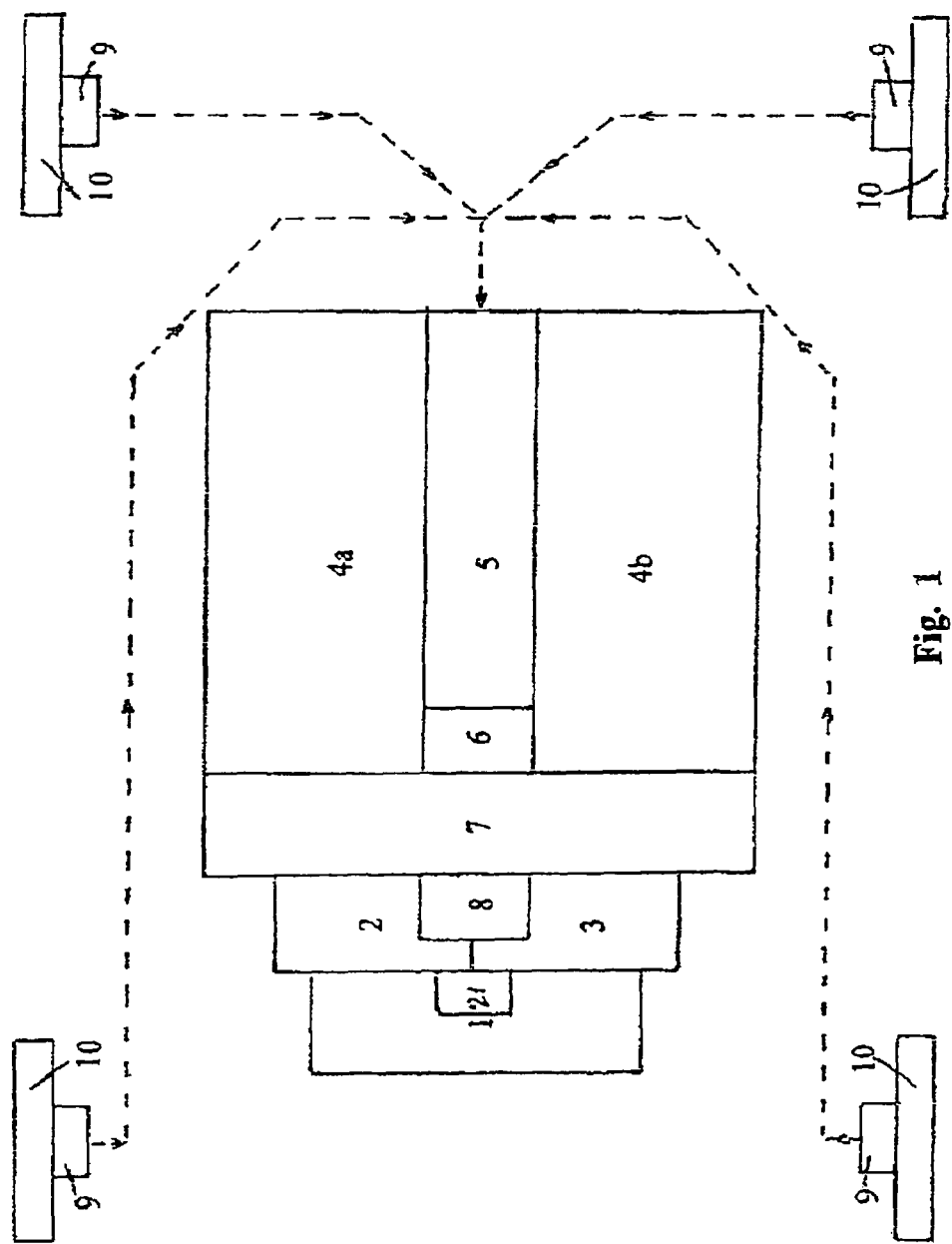
FIG. 1 is a schematic of the overall COMPEL SYSTEM

FIG. 1 shows the electric motor 1 that powers the wheels 10 by way of transmission 21 in a known manner derived from the drive of a combustion engine. At 2 is shown a compressed air engine which provides power to the primary generator 3. This primary generator 3 provides the electrical energy to the main batteries 4a and 4b. The batteries 4a and 4b are the electrical power sources that provide the power supply to the electrical motor 1. Only one battery is usually in service. While this one battery is in service, the other battery is being recharged to come on line when the operating battery becomes too low to service the electrical motor 1. As the second battery is called into service, the first battery changes to a mode of recharge. This process continues throughout the time the vehicle is in motion. At 5 is shown a third and completely separate battery. This battery receives charging from the four electricity generating sources. (FIGS. 2-4) that are mounted in or on or as part of the rotating wheels or axles of the vehicle. The function of this battery is to provide power to the electric air compressor motor 6 which maintains the constant supply of compressed air in the air storage tank 7. This battery may also accept plug-in service and is responsible for providing power to the other automotive devices found in any vehicle such as the horn, lights, radio AC etc. At 6 is shown the electric air compressor that feeds and maintains a proper level of supply to the compressed air tank 7. The compressed air tank 7 is the fuel tank and the reservoir for the requirements and demands of the compressed air engine. The air tank 7 is also fitted with a "fill-fitting" which allows for it to be filled from an outside source. This outside source could be a regular gas station having tire pressure facilities. This tank may be sized by engineering calculations to provide the compressed air engine 2 with a proper supply of compressed air for a period of up to one hour or more in the event of any breakdown of the electrical supply source chain.

At 8 is shown a computer. The operator of the vehicle controls the vehicle but relies on the functions of the computer to supplement the operator's moves. The heart of the system is the computer 8. Besides the operator, the computer is the absolute control center for all operations of the power system of the vehicle. However, operational functions can be programmed into the computer, if so desired. There are four electricity generating devices indicated at 9 that produce electrical charging energy to the battery 5. These sources draw energy from the rotating elements located on each of the axles which will be explained by reference to the subsequent drawings 2-4.

Figure 2:
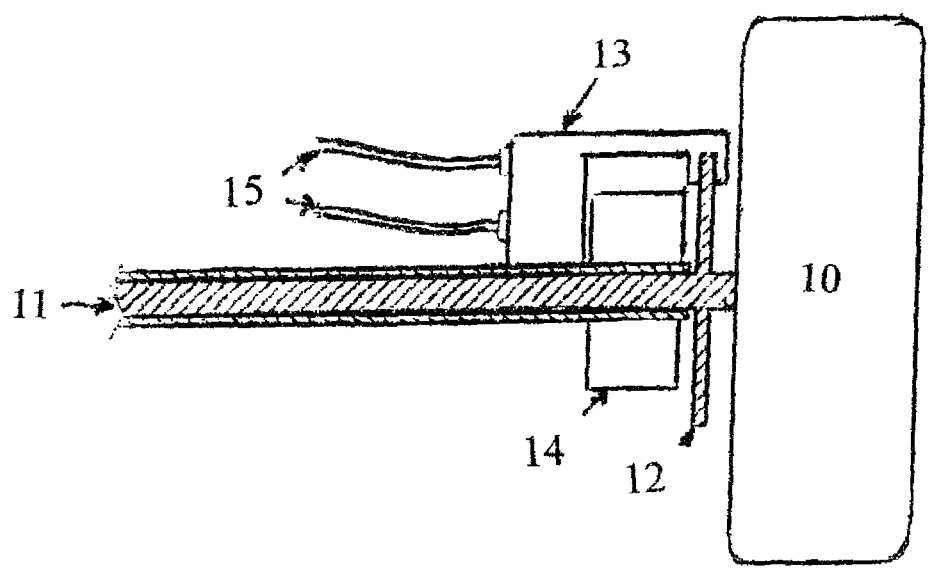
FIG. 2 shows an electricity generating device using the brake disc.
Figure 3:
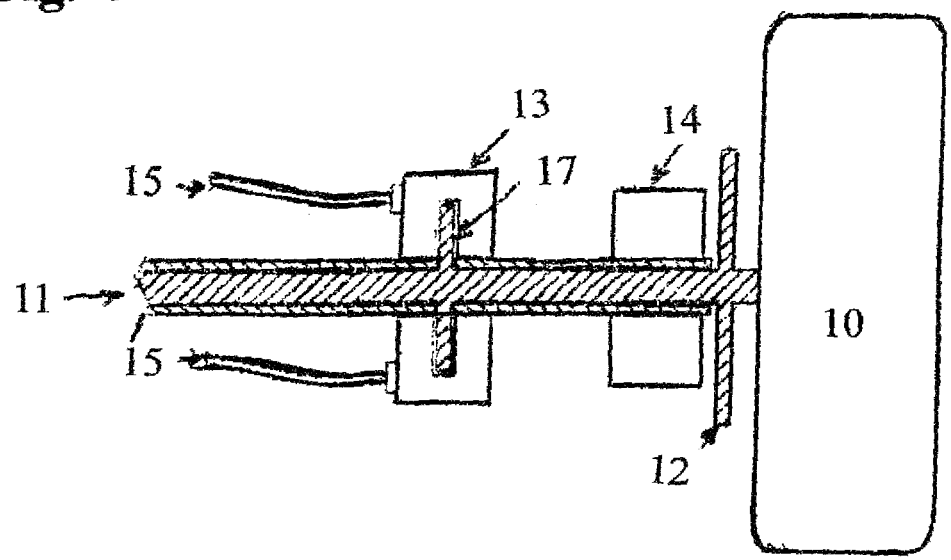
FIG. 3 shows an electricity generating device using a separate disc.
Figure 4:
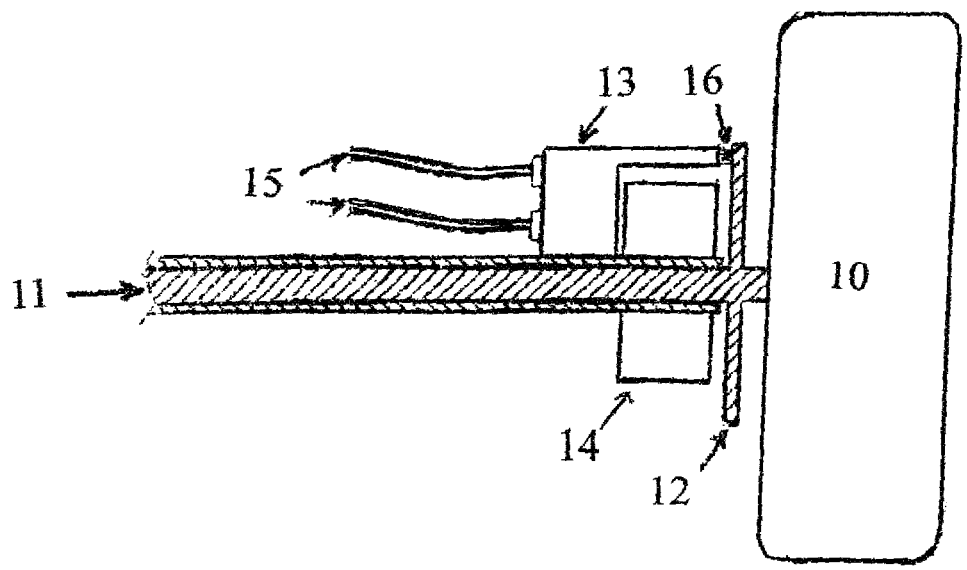
FIG. 4 shows an electricity generating device using the principle of electricity induction.

In FIG. 2 there is indicated one of the axles of the vehicle. This indication will be carried over to the following Figs. And so will other pertinent elements. The axle 11 carries for rotation the well known disc brake 12. On the axle 11 housing there is mounted a generator housing 13 which in conjunction with the disc brake 12 generates electricity by the well known principle of induction. The lead wires 15 connect the generated electricity to the computer 8 with one line and another line to the battery 5. The axle 11 is supported on the vehicle by way of the axle support 14. FIG. 3 illustrates a different way of generating the additional energy. The same reference characters are used as were in describing FIG. 2. In this example there is a separate disc 17 being used instead of the brake disc. This separate disc 17 is also driven by the axle 11 in its own housing 13. this may be advantageous because the use of brake discs is subject to wear and will have to be replaced sooner or later. The separate disc 17 is not subject to wear because no friction contact is present. The electricity is being generated again by the well known method of induction.

Another generator principle is shown in FIG. 4 where again the brake disc is being used. Again there is a generating housing having a contact arm having located at its end induction bushes 16 that by contact with the rotating brake disc 12 generate electricity that again is transferred to the computer 8 by way of wire 15 and another wire to the battery. This principle can also be used with a separate rotating disc, instead of the brake disc, as was explained with regard to FIG. 3.

OPERATION

The "COMPEL" vehicle has been sitting in the owner's garage facility overnight. All systems have obviously been shut down the night before and all systems were shut down in their full capacity, meaning, the batteries were in a full charge mode and the compressed air fuel tank was full.

The owner is going to use the vehicle and turns the ignition key to "on". This wakes up the computer and immediately the computer scans all the elements of the system and finds that all are in full capacity mode and this information is shown to the operator on the dash control panel.

The operator engages the vehicle in the drive mode. The computer selects one of the fully charged batteries 4a or 4b to be the initial power source for the drive of the vehicle and the selected battery which the computer, activates and makes the necessary gear selection in the transmission box 21. As is well known, the transmission drives all drive wheels by applying power for rotation. The vehicle is now moving at the speed and power required and selected by the operator. At this point the compressed air engine is not engaged nor are the four wheel/axle electric power generating sources because the remaining main batteries and the battery 5 are fully charged.

For the purpose of this outline, it is not determined how many miles can be traveled on the use of only one of the batteries because that will be a determination of the engineering of the vehicle manufacturer, but let it be assumed that the distance is 50 miles. That being the case, then at that point, somewhere near the 50 mile distance window, the computer will recognize that the battery being used is nearing its limit of output and will switch the power source requirement to the other fully charged main battery.

At this point in the vehicle operation, several other elements are activated by the computer. First, it is at this point that the compressed air engine is started and it begins its work of powering the generator. The generator also begins its work of restoring the depleted charge in the other main battery that was used for the first leg of the trip and the time of power restoration is timed by the computer to coincide with the rate of depletion of power being used by the second main battery now supplying the electric motor. This is determined by the speed and power demands of the vehicle as measured by the computer and the computer is assuring that when the now operating battery is at its point of depletion, the first main battery will be fully charged and again will be ready for full use. This process is repeated over and over again for however long the vehicle is in use and requires electrical charge to the electric engine.

Additional things happen also at this time as the compressed air engine is activated. Obviously, the compressed air engine is now using compressed air from the air "fuel" tank and therefore, the fuel tank supply must be replenished which is concurrent with the starting of the compressed air engine and the computer activates the electric compressor which, of course, begins to draw power from the third battery 5. The computer also activates the four wheel/axle devices and they begin delivering the recharge electricity to battery 5. The computer has the capacity to activate all or any combinations of the four wheel/axle power generating sources depending upon the level of charge and/or demand of battery 5.

Now the vehicle is perhaps over 50 miles down the road and all systems are in operation and the condition of each is made known to the vehicle operator by way of the display of the dash board gauges.

Perhaps the operator stops at a rest stop which, of course, renders the power generation to battery 5 to a temporary halt. The compressed air "fuel" tank has the capacity of storage to operate the compressed air engine for at least an hour, or whatever designers have determined, so the vehicle is fully capable of starting again from that point of view but also because the main operating battery is likely not yet at a point of depletion so when the operator is ready to start off again, he/she starts out. If however, the operating battery coincidentally is depleted at the time the operator decides to stop, the computer arranges the switch over to the now fully charged main battery so that the trip can be resumed and the recharge process continues.

The battery 5 is also responsible for providing power for operating all other electrical requirements of the vehicle such as the horn, lights, AC, etc. under certain operating conditions. Built into the system is a cross-over feature that will allow the computer to draw supplement power from the generator to battery 5 if the wheel/axle power sources do not satisfy the required needs. This cross-over feature will likely not be called upon frequently because of the capacity of the four wheel/axle sources, but it is factored in for safety purposes. If this cross-over feature is used, it will not reduce the recharging capacity of the generator to the main battery while under a charging mode. The computer will simply call upon a ratcheting-up of the output of the generator and this can be designed into the generator by the manufacturer.

Now the day has ended and the operator has either returned home or is at the destination somewhere along the trip. The operator can check the levels of all of the batteries and the compressed air "fuel" tank by checking with the computer. If the levels are not acceptable to the operator for his beginning of the next day's requirements, he can use the plug-in feature of all batteries to restore their full charges and if necessary, and the facility is available, the operator can fill the "fuel" tank to capacity with compressed air, however, if the batteries are fully charged, the compressed air tank will regain its capacity through operation.

The day trip has been successfully completed without the use of any fossil fuel, because it is not there, and provides a safe and comfortable vehicle.

The COMPEL system allows any vehicle to travel on an unlimited miles basis without having to be refueled.

What I claim is:

1. A drive system for a non-fossil fuel driven vehicle including a compressed air engine, said compressed air engine charges a series of batteries by way of a generator, said compressed air engine is driven by a compressed air tank, said compressed air tank being supplied by a compressor, said batteries are driving a single electric engine, said single electric engine is driving said vehicle, wherein all functions are controlled by a computer including said compressed air engine, generator, compressor, compressed air tank, said single air electric engine, batteries, all electricity producing devices and mechanisms, transmission functions and drive train mechanisms and any other and all devices or mechanisms either directly or indirectly whether involved with the motion and movement of said vehicle into which the system is integrated, along with all other parts and devices of said vehicle whether involved in the motion and/or movement of said vehicle or not, are monitored, regulated, adjusted and operated by said computer, including any and all additional electricity producing devices, wherein said additional electricity producing devices are driven by an axle, or axles of said vehicle while said vehicle is in motion.

2. The drive system for a non-fossil driven vehicle including a compressed air engine and a transmission driving wheels of said vehicle, said compressed air engine charges a battery by way of a generator, said compressed air engine is driven by way of a compressed air tank, said battery is driving a single electric engine, said single electric engine is driving said vehicle by way of said transmission, wherein said compressed air engine is controlled by a computer, including additional electricity producing devices, said additional producing devices are driven by a motion of said vehicle.

3. The drive system of claim 2, wherein said additional electricity devices are driven by an axle of said vehicle.

* * * * *